United States Patent
Wagh et al.

(10) Patent No.: US 12,389,909 B2
(45) Date of Patent: Aug. 19, 2025

(54) AGROCHEMICAL COMPOSITION

(71) Applicant: UPL LTD, Mumbai (IN)

(72) Inventors: Pradeep Wagh, Mumbai (IN); Rajan Ramakant Shirsat, Mumbai (IN)

(73) Assignee: UPL LTD, Mumbai (IN)

( * ) Notice: Subject to any disclaimer, the term of this patent is extended or adjusted under 35 U.S.C. 154(b) by 250 days.

(21) Appl. No.: 17/634,009

(22) PCT Filed: Feb. 10, 2021

(86) PCT No.: PCT/IB2021/051054
§ 371 (c)(1),
(2) Date: Feb. 9, 2022

(87) PCT Pub. No.: WO2021/161173
PCT Pub. Date: Aug. 19, 2021

(65) Prior Publication Data
US 2022/0369636 A1  Nov. 24, 2022

(30) Foreign Application Priority Data
Feb. 12, 2020  (IN) .............. 202021006143

(51) Int. Cl.
| | | |
|---|---|---|
| *A01N 43/40* | (2006.01) | |
| *A01N 25/04* | (2006.01) | |
| *A01N 43/86* | (2006.01) | |
| *A01N 43/88* | (2006.01) | |
| *A01N 47/40* | (2006.01) | |
| *A01N 47/44* | (2006.01) | |
| *A01P 7/04* | (2006.01) | |

(52) U.S. Cl.
CPC .......... *A01N 43/40* (2013.01); *A01N 25/04* (2013.01); *A01N 43/86* (2013.01); *A01N 43/88* (2013.01); *A01N 47/40* (2013.01); *A01N 47/44* (2013.01); *A01P 7/04* (2021.08)

(58) Field of Classification Search
None
See application file for complete search history.

(56) References Cited

U.S. PATENT DOCUMENTS

| | | | |
|---|---|---|---|
| 7,968,107 B2 | 6/2011 | Baur et al. | |
| 9,949,481 B2 | 4/2018 | Liu et al. | |
| 2011/0251070 A1* | 10/2011 | Poffenberger | A01N 25/30 504/358 |
| 2012/0004104 A1 | 1/2012 | Casana Giner et al. | |
| 2013/0171226 A1 | 7/2013 | Awazu et al. | |
| 2015/0111860 A1* | 4/2015 | Tanaka | A01N 43/54 514/148 |
| 2022/0159954 A1* | 5/2022 | Wagh | A01P 7/04 |

FOREIGN PATENT DOCUMENTS

| | | | | |
|---|---|---|---|---|
| RU | 2350078 C1 | 3/2009 | | |
| WO | WO-2020021406 A1 * | 1/2020 | ............ | A01N 25/02 |

OTHER PUBLICATIONS

International Search Report and Written Opinion for International Application PCT/IB2021/051054; International Filing Date: Feb. 10, 2021; Date of Mailing: May 3, 2021; 13 pages.

* cited by examiner

Primary Examiner — Sue X Liu
Assistant Examiner — Ali S Saeed
(74) Attorney, Agent, or Firm — CANTOR COLBURN LLP

(57) ABSTRACT

The present invention relates to an agrochemical composition comprising: a) a neonicotinoid or a 3-pyridine carboxamide insecticide; and b) a crystal growth inhibiting system wherein the crystal growth inhibiting system is a combination of a mineral oil and a surfactant mixture. The present invention further provides process, method, use and kit thereof.

6 Claims, No Drawings

AGROCHEMICAL COMPOSITION

CROSS REFERENCE TO RELATED APPLICATIONS

This application is a National Stage application of PCT/IB2021/051054, filed Feb. 10, 2021, which claims priority to Indian Application No. 202021006143, filed Feb. 12, 2020, both of which are incorporated by reference in their entirety herein.

FIELD OF THE INVENTION

The present invention relates to an agrochemical composition comprising a neonicotinoid insecticide or a 3-pyridine carboxamide insecticide. The present invention more particularly relates to an agrochemical composition comprising a neonicotinoid insecticide or a 3-pyridine carboxamide insecticide and a crystal growth inhibiting system suitable for increasing the shelf life of the composition.

BACKGROUND OF THE INVENTION

Suspension concentrate (SC) formulations are a solid active ingredient dispersed in water. SCs have grown in popularity due to benefits such as absence of dust, ease of use and effectiveness when compared to formulation types such as emulsifiable concentrate (EC) and wettable powder (WP) formulations. To formulate a stable SC, the active ingredient must remain insoluble under all temperature conditions.

Problem arises when slightly water-soluble ingredients are to be formulated as suspension concentrate. A major drawback of formulating a slightly water-soluble ingredient as an aqueous SC is Ostwald ripening, which refers to instances in which the larger crystals of the ingredient grow while the smaller crystals dissolve. Physical instability is one manifestation of Ostwald ripening. Further drawbacks to Ostwald ripening include limited utility of the formulation because an acceptable shelf-life may not be obtained. For instance, a two-year shelf-life is typically needed for a successful commercial product in agrochemicals. Also, crystals that grow too large may plug spray equipment and may not stay suspended in the spray tank or concentrated formulation.

Acetamiprid is a neonicotinoid insecticide affecting the synapses in the insect central nervous system. It is a systemic insecticide with translaminar activity and with contact and stomach action. It has been widely used for control of Hemiptera, especially aphids, Thysanoptera and Lepidoptera, by soil and foliar application, on a wide range of crops, especially vegetables, fruit and tea.

Flonicamid, a 3-pyridine carboxamide insecticide, is a selective feeding blocker. It has systemic and translaminar activity and gives long-term control. It is also effective against some other sucking insects.

Formulations of neonicotinoid insecticides or 3-pyridine carboxamide insecticide often exhibit stability problems related to rapid crystal formation of slightly soluble active ingredients, such as acetamiprid.

Gelling, caking and settling due to large crystals being formed in the final suspension concentrate formulation result in instability, difficulty in processing and unreliability in usage.

Thus, formulating suspension concentrate compositions of neonicotinoid insecticide and 3-pyridine carboxamide insecticide wherein this gelling, caking and settling are minimized is crucial to the stability of neonicotinoid suspension concentrates which is then necessary to obtain an even distribution of active compound for insecticidal application.

Selection of appropriate partners/constituents constituting the suspension concentrate plays a critical role towards stability of the composition. Hence, there is a need to develop stable agrochemical compositions of neonicotinoid insecticide or 3-pyridine carboxamide insecticide which do not undergo crystal formation of the active and remain stable throughout the shelf life as well as during application when it is diluted with water.

OBJECTIVES OF THE INVENTION

An object of the present invention is to provide an agrochemical composition of neonicotinoid or 3-pyridine carboxamide insecticide.

Another object of the present invention is to provide an agrochemical composition of neonicotinoid or 3-pyridine carboxamide insecticide in the form of a suspension concentrate.

Another object of the present invention is to provide an agrochemical composition of neonicotinoid or 3-pyridine carboxamide insecticide which prevents crystal growth of the active ingredients in the suspension concentrate composition.

Yet another object of the present invention is to provide a process for preparing an agrochemical composition comprising neonicotinoid or 3-pyridine carboxamide insecticide.

SUMMARY OF THE INVENTION

In an aspect of the present invention, an agrochemical composition comprises:
  a) a neonicotinoid or a 3-pyridine carboxamide insecticide; and
  b) a crystal growth inhibiting system.

In an aspect of the present invention, an agrochemical composition comprises:
  a) a neonicotinoid or a 3-pyridine carboxamide insecticide; and
  b) a crystal growth inhibiting system;
  wherein the crystal growth inhibiting system is a combination of a mineral oil and a surfactant mixture.

In another aspect of the present invention, an agrochemical composition comprises:
  a) a neonicotinoid or a 3-pyridine carboxamide insecticide; and
  b) a crystal growth inhibiting system;
  wherein the crystal growth inhibiting system is a combination of a mineral oil and surfactant mixture of an anionic and a non-ionic surfactant.

In an aspect of the present invention, a process of preparing an agrochemical composition, said process comprising (a) admixing a neonicotinoid insecticide or a 3-pyridine carboxamide insecticide and an aqueous solution comprising a crystal growth inhibiting system to obtain a suspension concentrate formulation.

The present invention also provides a process for preparing an agrochemical composition comprising a) a neonicotinoid or a 3-pyridine carboxamide insecticide; and b) a crystal growth inhibiting system; wherein said process comprising steps of:
  (a) admixing a neonicotinoid insecticide or a 3-pyridine carboxamide insecticide and an aqueous solution comprising a crystal growth inhibiting system to obtain a mixture;

(b) milling the mixture to obtain a uniform dispersion; and
(c) jellifying the dispersion to obtain a suspension concentrate.

In yet another aspect of the present invention, a method of controlling undesired insects, said method comprising applying to the pests or to their locus an insecticidally effective amount of an agrochemical composition comprising a) a neonicotinoid or a 3-pyridine carboxamide insecticide; and b) a crystal growth inhibiting system.

Additional features and advantages of the present invention will be apparent from the detailed description that follows, which illustrates by way of example, the most preferred features of the present invention which are not to be construed as limiting the scope of the invention described herein.

DETAILED DESCRIPTION OF THE INVENTION

Inventors of the present invention surprisingly found a storage stable agrochemical composition of slightly soluble neonicotinoid insecticide or a 3-pyridine carboxamide insecticide can be obtained by formulating a neonicotinoid or a 3-pyridine carboxamide insecticide along with a crystal growth inhibiting system wherein crystal growth inhibiting system comprises a mineral oil and a surfactant mixture. Inventors of the present invention observed that the composition developed using combination of a mineral oil and a surfactant mix does not lead to crystal growth, remained stable during ambient as well as accelerated heat stability test conditions.

The present invention results into storage stable agrochemical composition in which crystal growth inhibiting system does not favor Ostwald ripening and the composition remains stable throughout the shelf life and also upon dilution before applying.

Therefore, in an embodiment of the present invention, an agrochemical composition comprises:
  a) a neonicotinoid or a 3-pyridine carboxamide insecticide; and
  b) a crystal growth inhibiting system.

In an embodiment of the present invention, an agrochemical composition comprises a neonicotinoid insecticide.

In an embodiment of the present invention, the neonicotinoid insecticide is selected from the group comprising acetamiprid, clothianidin, imidacloprid, nitenpyram, nithiazine, thiacloprid or thiamethoxam.

In a preferred embodiment of the present invention, the neonicotinoid insecticide is acetamiprid.

In an embodiment of the present invention, the neonicotinoid insecticide is imidacloprid.

In an embodiment of the present invention, the neonicotinoid insecticide is thiacloprid.

In an embodiment of the present invention, the neonicotinoid insecticide is clothianidin.

In an embodiment of the present invention, the agrochemical composition comprises from about 1% to about 70% w/w and preferably from about 5% to about 60% w/w neonicotinoid insecticide of the total weight of the agrochemical composition.

In a preferred embodiment of the present invention, the agrochemical composition comprises from about 10% to about 50% w/w neonicotinoid insecticide of the total weight of stable agrochemical composition.

In an embodiment of the present invention, an agrochemical composition comprises of a 3-pyridine carboxamide insecticide.

In an embodiment of the present invention the 3-pyridine carboxamide insecticide is flonicamid.

In an embodiment of the present invention, the agrochemical composition comprises from about 1% to about 70% w/w and preferably from about 5% to about 60% w/w 3-pyridine carboxamide insecticide of the total weight of the agrochemical composition.

In a preferred embodiment of the present invention, the agrochemical composition comprises from about 10% to about 50% w/w 3-pyridine carboxamide insecticide of the total weight of the agrochemical composition.

In an embodiment of the present invention, an agrochemical composition comprises of a crystal growth inhibiting system.

In an embodiment of the present invention, a crystal growth inhibiting system of the agrochemical composition is a combination of mineral oil and a surfactant mix.

In an embodiment of the present invention, the crystal growth inhibiting system comprises of a mineral oil.

In an embodiment of the present invention, the mineral oil component of a crystal growth inhibiting system comprises of paraffinic, isoparaffinic, cycloparaffinic or naphthenic oils origin selected from the group comprising of hydrotreated light paraffinic distillate (also known as white spirit, light mineral oil, white mineral oil), white spirit, petroleum, alkylbenzenes and spindle oil or a mixture thereof.

In a preferred embodiment of the present invention, the mineral oil component of a crystal growth inhibiting system is hydrotreated light paraffinic distillate (white mineral oil).

In an embodiment of the present invention, the agrochemical composition comprising from about 0.1% to about 50% w/w and preferably from about 1% to about 40% w/w mineral oil of the total weight of the agrochemical composition.

In a preferred embodiment of the present invention, the agrochemical composition comprises from about 5% to about 30% w/w mineral oil of the total weight of the agrochemical composition.

In an embodiment of the present invention, a crystal growth inhibiting system of an agrochemical composition is a combination of mineral oil and a surfactant mix.

In an embodiment of the present invention, a crystal growth inhibiting system of an agrochemical composition is a combination of white mineral oil and a surfactant mix of anionic and non-ionic surfactants.

In an embodiment of the present invention, surfactant mix of crystal growth inhibiting system comprises a non-ionic surfactant and an anionic surfactant.

In an embodiment of the present invention, the non-ionic surfactant of the surfactant mix is selected from the group comprising of nonionic surfactants such as polyalkyleneoxide siloxanes, ethoxylated derivatives of fatty alcohols, alkyl glucosides, alkyl phenols, polyalkylene glycol ethers and condensation products of alkyl phenols, amines, fatty acids, fatty esters, mono-, di-, or triglycerides, various block copolymeric surfactants derived from alkylene oxides such as ethylene oxide/propylene oxide, aliphatic amines or fatty acids with ethylene oxides and/or propylene oxides such as the ethoxylated alkyl phenols or ethoxylated aryl or polyaryl phenols, carboxylic esters solubilized with a polyol or polyvinyl alcohol/polyvinyl acetate copolymers, polyvinyl alcohol, polyvinyl pyrrolidinones and acrylic acid graft copolymers and mixtures, reaction products, and/or copolymers thereof.

In a preferred embodiment of the present invention, non-ionic surfactant of surfactant mix is selected from the group comprising of nonionic surfactants such as various block copolymeric surfactants derived from alkylene oxides such as ethylene oxide/propylene oxide, aliphatic amines or fatty acids with ethylene oxides and/or propylene oxides such as the ethoxylated alkyl phenols or ethoxylated aryl or polyaryl phenols, their mixtures, reaction products, and/or copolymers thereof.

In an embodiment of the present invention, the agrochemical composition comprises from about 0.1% to about 50% w/w and preferably from about 1% to about 40% w/w non-ionic surfactant of the total weight of the agrochemical composition.

In a preferred embodiment of the present invention, the agrochemical composition comprises from about 5% to about 30% w/w non-ionic surfactant of the total weight of the agrochemical composition.

In an embodiment of the present invention, anionic surfactant of crystal growth inhibiting system is selected from the group comprising of alkyl and aryl sulfates and sulfonates, including sodium alkyl sulfates, sodium mono- and di-alkyl naphthalene sulfonates, sodium alpha-olefin sulfonate, lignin and its derivatives (such as lignosulfonate salts), sodium alkane sulfonates, polyoxyalkyene alkylether sulfate, polyoxyalkylene alkylaryl ether sulfates, polyoxyalkylene styrylphenyl ether sulfate, mono- and di-alkylbenzene sulfonates, alkylnaphthalene sulfonate, alkylnaphthalene sulfonate formaldehyde condensate, alkyl diphenylether sulfonates, olefinic sulfonates, alkylphosphates, polyoxyalkylene alkyl phosphates, polyoxyalkylene phenylether phosphate, polyoxyalkylphenol phosphates, poly-carboxylates, fatty acids and salts thereof, alkyl glycinates, sulfonated methyl esters, sulfonated fatty acids, sulfosuccinates and their derivatives, acyl glutamates, acyl sarcosinates, alkyl sulfoacetates, acylated peptides, alkyl ether carboxylates, acyl lactylates, anionic fluorosurfactants, amide ether sulfates, N-methyl fatty acid taurides, mixtures thereof and the like, including sodium, potassium, ammonium and amine salts, etc. or mixtures thereof.

In a preferred embodiment of the present invention, the anionic surfactant of crystal growth inhibiting system is selected from the group comprising alkyl and aryl sulfates and sulfonates, including sodium alkyl sulfates, sodium mono- and di-alkyl naphthalene sulfonates, lignin and its derivatives (such as lignosulfonate salts), polyoxyalkyene alkylether sulfate, alkylnaphthalene sulfonate, alkylnaphthalene sulfonate formaldehyde condensate.

In an embodiment of the present invention, the agrochemical composition comprising from about 0.1% to about 50% w/w and preferably from about 1% to about 40% w/w anionic surfactant of the total weight of the agrochemical composition.

In a preferred embodiment of the present invention, the agrochemical composition comprises from about 5% to about 30% w/w anionic surfactant of the total weight of the agrochemical composition.

In an embodiment of the present invention, the surfactant mix of crystal growth inhibiting system comprises a non-ionic surfactant and an anionic surfactant in the ratio from about 1:10 to about 10:1.

In an embodiment of the present invention, the agrochemical composition may further comprise one or more of antifreeze agents, wetting agents, fillers, surfactants, anticaking agents, pH-regulating agents, preservatives, biocides, antifoaming agents, colorants and other formulation aids.

Suitable antifreeze agents that can be added to the agrochemical composition are liquid polyols, for example ethylene glycol, propylene glycol or glycerol.

Wetting agents that can be added to the agrochemical composition of the present invention include, but are not limited to: polyarylalkoxylated phosphate esters and their potassium salts (e.g., Soprophor® FLK, Stepfac TSP PE-K. Other suitable wetting agents include sodium dioctylsulfosuccinates (e.g., Geropon® SDS, Aerosol® OT) and ethoxylated alcohols (e.g., Trideth-6; Rhodasurf® BC 610; Tersperse® 4894).

Optionally, about 0.1 wt % to about 5.0 wt % of antifoaming or defoamers are employed to stop any unwanted foam generated while manufacturing highly concentrated liquid biocide dispersion composition of the present application. The preferred antifoaming agent is selected from the group of silicone-based compounds, alcohols, glycol ethers, mineral spirits, acetylene diols, polysiloxanes, organosiloxanes, siloxane glycols, reaction products of silicon dioxide and organosiloxane polymer, polydimethylsiloxanes or polyalkylene glycols alone or in combination. Defoamers that are suitable include SAG-10; SAG-1000AP; SAG-1529; SAG-1538; SAG-1571; SAG-1572; SAG-1575; SAG-2001; SAG-220; SAG-290; SAG-30; SAG-30E; SAG-330; SAG-47; SAG-5440; SAG-7133 and SAG-770.

Examples of thickening agents based on anionic heteropolysaccharides from the xanthan gum group are inter alia the Rhodopol 23®, Rhodopol G®), Rhodopol 50 MD®, Rhodicare T®, Kelzan®, Kelzan S® and Satiaxane CX91®.

Preservatives used may be benzisothiazolinone (Proxel GXL) or phonols, 2-bromo-2-nitropropane-1,3-diol (Bioban BP 30), 5-chloro-2-methyl-4-isothiazolin-3-one & 2 methyl-4-isothiazolin-3 one (Kathon CG/ICP), Glutaraldehyde (Ucarcide 50), Chloromethylisothiazolinone (CMIT)/Methylisothiazolinone (MIT) (Isocil Ultra 1.5), 2.2-dibromo-3-nitrilopropioamide (Reputain 20), Natamycin & Nisin, Bronopol/CMIT/MIT (Mergal 721 K3).

Suitable colorants (for example in red, blue and green) are, preferably, pigments, which are sparingly soluble in water, and dyes, which are water-soluble. Examples are inorganic coloring agents (for example iron oxide, titanium oxide, and iron hexacyanoferrate) and organic coloring agents (for example alizarin, azo and phthalocyanin coloring agents).

Fillers may include an organic or inorganic solid inert substance such as talc, clay, diatomaceous earth, magnesium aluminum silicate, white carbon black, pyrophyllite, light calcium carbonate, high clay, organic bentonite, etc. or mixtures thereof.

In an embodiment of the present invention, the agrochemical composition may further comprise of a second active ingredient selected from insecticides.

In an embodiment of the present invention, the agrochemical composition may further comprise of a second active ingredient selected from group comprising of clothianidin, chlorantraniliprole, beta-cyfluthrin, lambda-cyhalothrin, tefluthrin, fipronil, and abamectin.

In an embodiment of the present invention, an agrochemical composition comprising a neonicotinoid or a 3-pyridine carboxamide insecticide; and a crystal growth inhibiting system, wherein said agrochemical composition is in the form of suspension concentrate (SC), emulsifiable concentrate (EC), flowable concentrate for seed treatment (FS), Microemulsion (ME), Oil Dispersion (OD), Suspoemulsion (SE) and the like.

In a preferred embodiment of the present invention, the agrochemical composition comprising a neonicotinoid insecticide; and a crystal growth inhibiting system wherein said agrochemical composition is in the form of suspension concentrate (SC).

In a preferred embodiment of the present invention, the agrochemical composition comprises a 3-pyridine carboxamide insecticide; and a crystal growth inhibiting system wherein said agrochemical composition is in the form of suspension concentrate (SC).

In a preferred embodiment of the present invention, the agrochemical composition comprises a neonicotinoid insecticide; and a crystal growth inhibiting system wherein said agrochemical composition is in the form of flowable concentrate for seed treatment (FS).

In a preferred embodiment of the present invention, the agrochemical composition comprises a 3-pyridine carboxamide insecticide; and a crystal growth inhibiting system wherein said agrochemical composition is in the form of flowable concentrate for seed treatment (FS).

In an embodiment of the present invention, the agrochemical composition comprises from about 0.1% to about 70% w/w neonicotinoid insecticide, from about 0.1% to about 40% w/w crystal growth inhibiting system of the total weight of the agrochemical composition.

In a preferred embodiment of the present invention, the agrochemical composition comprises from about 10% to about 60% w/w neonicotinoid insecticide, from about 0.1% to about 40% w/w crystal growth inhibiting system of the total weight of the agrochemical composition.

In an embodiment of the present invention, the agrochemical composition comprises from about 0.1% to about 70% w/w 3-pyridine carboxamide insecticide, from about 0.1% to about 40% w/w crystal growth inhibiting system of the total weight of the agrochemical composition.

In an embodiment of the present invention, the mineral oil and surfactant mix are in a ratio 1:1.5.

In an embodiment of the present invention, the mineral oil and surfactant mix are in a ratio 1:1.

In an embodiment of the present invention, the agrochemical composition comprises from about 0.1% to about 70% w/w 3-pyridine carboxamide insecticide, from about 0.1% to about 40% w/w mineral oil, from about 0.1% to about 40% w/w non-ionic surfactant, from about 0.1% to about 40% w/w anionic surfactant of the total weight of the agrochemical composition.

In a preferred embodiment of the present invention, the agrochemical composition comprises from about 10% to about 40% w/w neonicotinoid insecticide, from about 0.1% to about 40% w/w mineral oil, from about 0.1% to about 40% w/w non-ionic surfactant, from about 0.1% to about 40% w/w anionic surfactant of the total weight of the agrochemical composition.

In a preferred embodiment of the present invention, the agrochemical composition comprises from about 10% to about 40% w/w neonicotinoid insecticide, from about 0.1% to about 40% w/w white mineral oil, from about 0.1% to about 40% w/w ethylene oxide/propylene oxide block copolymer, from about 0.1% to about 40% w/w lignosulfonate of the total weight of the agrochemical composition wherein said agrochemical composition is in the form of suspension concentrate.

In a preferred embodiment of the present invention, the agrochemical composition comprises from about 10% to about 40% w/w neonicotinoid insecticide, from about 0.1% to about 40% w/w white mineral oil, from about 0.1% to about 40% w/w ethylene oxide/propylene oxide block copolymer, from about 0.1% to about 40% w/w lignosulfonate of the total weight of the agrochemical composition.

In a preferred embodiment of the present invention, the agrochemical composition comprises from about 10% to about 40% w/w neonicotinoid insecticide, from about 0.1% to about 40% w/w white mineral oil, from about 0.1% to about 40% w/w ethylene oxide/propylene oxide block copolymer, from about 0.1% to about 40% w/w lignosulfonate of the total weight of the agrochemical composition wherein said agrochemical composition is in the form of suspension concentrate.

In an embodiment of the present invention, a process of preparing an agrochemical composition comprises a) a neonicotinoid or a 3-pyridine carboxamide insecticide; and b) a crystal growth inhibiting system wherein said process comprises: admixing, neonicotinoid insecticide or a 3-pyridine carboxamide and an aqueous solution comprising crystal growth inhibiting system (s) to obtain mixture, milling the resulting mixture to obtain uniform dispersion; jellifying the uniform dispersion to obtain suspension concentrate and packaging the resulting agrochemical composition as suspension concentrate.

According to an embodiment of the present invention, a process for the preparation of an agrochemical composition comprising a) a neonicotinoid or a 3-pyridine carboxamide insecticide; and b) a crystal growth inhibiting system, said process comprising: admixing neonicotinoid insecticide or a 3-pyridine carboxamide and an aqueous solution comprising a crystal growth inhibiting system, antifreezing agent(s), wetting agent(s) and antifoaming agent(s), milling the resulting mixture to reduce particle size of suspended particles; admixing thickening agents, antifreezing agents, preservatives and optionally other auxiliary ingredients; and packaging the resulting agrochemical composition.

According to another embodiment of the present invention, a process for the preparation of an agrochemical composition comprising acetamiprid; a crystal growth inhibiting system wherein said process comprising: admixing acetamiprid and an aqueous solution comprising mineral oil, at least one nonionic surfactant, at least one anionic surfactant, antifreezing agent(s), wetting agent(s) and antifoaming agent(s), milling the resulting mixture to reduce particle size of suspended particles; admixing thickening agents; antifreezing agents, preservatives and optionally other auxiliary ingredients; and packaging the resulting agrochemical composition.

According to another embodiment of the present invention, a process for the preparation of the agrochemical composition comprising flonicamid; a crystal growth inhibiting system wherein said process comprises: admixing flonicamid and an aqueous solution comprising mineral oil, at least one nonionic surfactant, at least one anionic surfactant as a part of crystal growth inhibiting system, antifreezing agent(s), wetting agent(s) and antifoaming agent(s), milling the resulting mixture to reduce particle size of suspended particles; admixing thickening agents; antifreezing agents, preservatives and optionally other auxiliary ingredients; and packaging the resulting agrochemical composition.

In an embodiment, the mixture comprising the insecticide and the crystal growth inhibiting system is milled obtain a uniform dispersion.

In an embodiment, the dispersion is jellified obtain a suspension concentrate.

In an embodiment, the agrochemical composition of the invention has a particle size distribution ($D_{50}$) of less than about 10.0 microns.

In an embodiment, the agrochemical composition of the invention has a particle size distribution ($D_{50}$) of less than about 7.0 microns.

According to an embodiment of the present invention, the agrochemical composition prepared in above steps is subjected to particle size reduction by applying shear to the mixture of active ingredients, crystal growth inhibiting system and other auxiliary agents. Suitable devices for this purpose are the devices that offers milling operation e.g. high shear mixers like ROS HSM, Ultra-Turrax apparatus, and dissolvers, static mixers, e.g. systems having mixing nozzles, bead mills, vibratory mills, agitator bead mills, colloid mills, cone mills, circulating mills (agitator ball mills with pin grinding system), disk mills, annular chamber mills, double cone mills, sprocket dispersers or homogenizers and other homogenizers.

According to an embodiment of the present invention, the agrochemical composition is designed to be diluted with water (or a water-based liquid) to form the corresponding end-use agrochemical formulations, typically spray formulations.

According to an embodiment of the present invention, the agrochemical composition has a pH ranging from 5-7.

According to an embodiment of the present invention, the agrochemical composition has a variation in pH of no more than 20% when stored at 54° C. for between 24 hours and 28 days.

In an embodiment of the present invention, a method of controlling undesired insects, said method comprising applying to the pests or to their locus an insecticidally effective amount of an agrochemical composition comprising a) a neonicotinoid insecticide or a 3-pyridine carboxamide insecticide; and b) a crystal growth inhibiting system.

In an embodiment of the present invention, a method of controlling undesired insects, said method comprising applying to the pests or to their locus an insecticidally effective amount of an agrochemical composition comprising a) a neonicotinoid insecticide or a 3-pyridine carboxamide insecticide; and b) a crystal growth inhibiting system comprising mineral oil, a non-ionic surfactant and an anionic surfactant.

In an embodiment of the present invention, a method of controlling undesired insects, said method comprising applying to the pests or to their locus an insecticidally effective amount of an agrochemical composition comprising a) acetamiprid; and b) a crystal growth inhibiting system comprising white mineral oil, a non-ionic surfactant and an anionic surfactant.

In an embodiment of the present invention, a method of controlling undesired insects, said method comprising applying to the pests or to their locus an insecticidally effective amount of an agrochemical composition comprising a) flonicamid; and b) a crystal growth inhibiting system comprising white mineral oil, a non-ionic surfactant and an anionic surfactant.

In an embodiment of the present invention, there is provided a method of controlling undesired insects, said method comprising applying to the plant propagation material or seeds, an insecticidally effective amount of an agrochemical composition comprising a) flonicamid; and b) a crystal growth inhibiting system comprising white mineral oil, a non-ionic surfactant and an anionic surfactant along with other suitable excipients.

In an embodiment of the present invention, the agrochemical composition comprising a neonicotinoid insecticide or a 3-pyridine carboxamide and crystal growth inhibiting system according to the present invention is used as an insecticide.

In an embodiment of the present invention, the agrochemical composition comprising acetamiprid and a crystal growth inhibiting system according to the present invention is used as an insecticide.

In an embodiment of the present invention, the agrochemical composition comprising flonicamid and crystal growth inhibiting system according to the present invention is used as an insecticide.

In an embodiment of the present invention, the agrochemical composition comprising flonicamid and a crystal growth inhibiting system according to the present invention is used as an insecticide for the treatment of plant propagation material or seeds.

In an embodiment, the present invention provides a kit comprising: a) a neonicotinoid or a 3-pyridine carboxamide insecticide; and b) a crystal growth inhibiting system as an insecticide.

According to an embodiment of the present invention, the various components of the agrochemical composition can be used individually or already partially or completely mixed with one another to prepare the composition according to the invention. It is also possible for them to be packaged and used further as combination composition such as a kit of parts.

In one embodiment of the invention, the kits may include one or more, including all, components that may be used to prepare the agrochemical composition. E.g., kits may include active ingredients and/or crystal growth inhibiting system. One or more of the components may already be combined together or pre-formulated. In those embodiments where more than two components are provided in a kit, the components may already be combined together and as such are packaged in a single container such as a vial, bottle, can, pouch, bag or canister.

In other embodiments, two or more components of a kit may be packaged separately, i.e., not pre-formulated. As such, kits may include one or more separate containers such as vials, cans, bottles, pouches, bags or canisters, each container containing a separate component for the agrochemical composition.

In both forms, a component of the kit may be applied separately from or together with the further components or as a component of a combination composition according to the invention for preparing the agrochemical composition according to the invention.

In a preferred embodiment of the present invention, the stable agrochemical composition comprising (a) a neonicotinoid or a 3-pyridine carboxamide insecticide (b) a crystal growth inhibiting system is provided in the form of a kit with single pack or multi pack.

The composition described above is insecticidally active and is stable. It has been found that the crystal growth inhibiting system of the agrochemical composition of the present invention provides excellent stability over time and at various temperatures, and even when the agrochemical composition undergoes shear forces for example on mixing. Also, the agrochemical composition obtained has a superior suspensibility, better dispersibility, very low or no sedimentation and little particle degradation.

All the features described herein may be combined with any of the above aspects, in any combination.

In order that the present invention may be more readily understood, reference will now be made, by way of example, to the following description. It will be understood that all tests and physical properties listed have been determined at atmospheric pressure and room temperature (i.e. 25° C.), unless otherwise stated herein, or unless otherwise stated in the referenced test methods and procedures.

In an embodiment, the insect pest may be from Lepidopteran, Coleopteran, Hemipteran, or Homopteran species. However, the choice of the target insect pests is not limiting.

In an embodiment, Lepidopteran pest species which negatively impact agriculture include, but are not limited to, *Achoea janata*, *Adoxophyes* spp., *Adoxophyes orana*, *Agrotis* spp. (cutworms), *Agrotis ipsilon* (black cutworm), *Alabama argillacea* (cotton leafworm), *Amorbia cuneana*, *Amyelosis transitella* (navel orangeworm), *Anacamptodes defectaria*, *Anarsia lineatella* (peach twig borer), *Anomis sabulifera* (jute looper), *Anticarsia gemmatalis* (velvetbean caterpillar), *Archips argyrospila* (fruittree leafroller), *Archips rosana* (rose leaf roller), *Argyrotaenia* spp. (tortricid moths), *Argyrotaenia citrana* (orange *tortrix*), *Autographa gamma*, *Bonagota cranaodes*, *Borbo cinnara* (rice leaf folder), *Bucculatrix thurberiella* (cotton leafperforator), *Caloptilia* spp. (leaf miners), *Capua reticulana*, *Carposina niponensis* (peach fruit moth), *Chilo* spp., *Chlumetia transversa* (mango shoot borer), *Choristoneura rosaceana* (obliquebanded leaf roller), *Chrysodeixis* spp., *Cnaphalocerus medinalis* (grass leafroller), *Colias* spp., *Conpomorpha cramerella*, *Cossus cossus* (carpenter moth), *Crambus* spp. (Sod webworms), *Cydia funebrana* (plum fruit moth), *Cydia molesta* (oriental fruit moth), *Cydia nignicana* (pea moth), *Cydia pomonella* (codling moth), *Darna diducta*, *Diaphania* spp. (stem borers), *Diatraea* spp. (stalk borers), *Diatraea saccharalis* (sugarcane borer), *Diatraea graniosella* (southwester corn borer), *Earias* spp. (bollworms), *Earias insulata* (Egyptian bollworm), *Earias vitella* (rough northern bollworm), *Ecdytopopha aurantianum*, *Elasmopalpus lignosellus* (lesser cornstalk borer), *Epiphysias postruttana* (light brown apple moth), *Ephestia* spp. (flour moths), *Ephestia cautella* (almond moth), *Ephestia elutella* (tobbaco moth), *Ephestia kuehniella* (Mediterranean flour moth), *Epimeces* spp., *Epinotia aporema*, *Erionota thrax* (banana skipper), *Eupoecilia ambiguella* (grape berry moth), *Euxoa auxiliaris* (army cutworm), *Feltia* spp. (cutworms), *Gortyna* spp. (stemborers), *Grapholita molesta* (oriental fruit moth), *Hedylepta indicata* (bean leaf webber), *Helicoverpa* spp. (noctuid moths), *Helicoverpa armigera* (cotton bollworm), *Helicoverpa zea* (bollworm/corn earworm), *Heliothis* spp. (noctuid moths), *Heliothis virescens* (tobacco budworm), *Hellula undalis* (cabbage webworm), *Indarbela* spp. (root borers), *Keiferia lycopersicella* (tomato pinworm), *Leucinodes orbonalis* (eggplant fruit borer), *Leucoptera malifoliella*, *Lithocollectis* spp., *Lobesia botrana* (grape fruit moth), *Loxagrotis* spp. (noctuid moths), *Loxagrotis albicosta* (western bean cutworm), *Lymantria dispar* (gypsy moth), *Lyonetia clerkella* (apple leaf miner), *Mahasena corbetti* (oil palm bagworm), *Malacosoma* spp. (tent caterpillars), *Mamestra brassicae* (cabbage armyworm), *Maruca testulalis* (bean pod borer), *Metisa plana* (bagworm), *Mythimna unipuncta* (true armyworm), *Neoleucinodes elegantalis* (small tomato borer), *Nymphula depunctalis* (rice caseworm), *Operophthera brumata* (winter moth), *Ostrinia nubilalis* (European corn borer), *Oxydia vesulia*, *Pandemis cerasana* (common currant *tortrix*), *Pandemis heparana* (brown apple *tortrix*), *Papilio demodocus*, *Pectinophora gossypiella* (pink bollworm), *Peridroma* spp. (cutworms), *Peridroma saucia* (variegated cutworm), *Perileucoptera coffeella* (white coffee leafminer), *Phthorimaea operculella* (potato tuber moth), *Phyllocnisitis citrella*, *Phyllonorycter* spp. (leafminers), *Pieris rapae* (imported cabbageworm), *Plathypena scabra*, *Plodia interpunctella* (Indian meal moth), *Plutella xylostella* (diamondback moth), *Polychrosis viteana* (grape berry moth), *Prays endocarpa*, *Prays oleae* (olive moth), *Pseudaletia* spp. (noctuid moths), *Pseudaletia unipunctata* (armyworm), *Pseudoplusia includens* (soybean looper), *Rachiplusia nu*, *Scirpophaga incertulas*, *Sesamia* spp. (stemborers), *Sesamia inferens* (pink rice stem borer), *Sesamia nonagrioides*, *Setora nitens*, *Sitotroga cerealella* (Angoumois grain moth), *Sparganothis pilleriana*, *Spodoptera* spp. (armyworms), *Spodoptera exigua* (beet armyworm), *Spodoptera fugiperda* (fall armyworm), *Spodoptera oridania* (southern armyworm), *Synanthedon* spp. (root borers), *Thecla basilides*, *Thermisia gemmatalis*, *Tineola bisselliella* (webbing clothes moth), *Trichoplusia ni* (cabbage looper), *Tuta absoluta*, *Yponomeuta* spp., *Zeuzera coffeae* (red branch borer) and *Zeuzera pyrina* (leopard moth).

In yet another embodiment, the insect pests are of the order Orthoptera, such as *Anabrus simplex* (Mormon cricket), *Gryllotalpidae* (mole crickets), *Locusta migratoria*, *Melanoplus* spp. (grasshoppers), *Microcentrum retinerve* (angularwinged katydid), *Pterophylla* spp. (kaydids), *chistocerca gregaria*, *Scudderia furcata* (forktailed bush katydid) and *Valanga nigricorni*.

In yet another embodiment, the insect pests are of the order Thysanoptera, such as *Frankliniella fusca* (tobacco *thrips*), *Frankliniella occidentalis* (western flower *thrips*), *Frankliniella shultzei* *Frankliniella williamsi* (corn *thrips*), *Heliothrips haemorrhaidalis* (greenhouse *thrips*), *Riphiphorothrips cruentatus*, *Scirtothrips* spp., *Scirtothrips citri* (citrus *thrips*), *Scirtothrips dorsalis* (yellow tea *thrips*), *Taeniothrips rhopalantennalis* and *Thrips* spp.

In an embodiment Coleopteran insect pests may be selected from but not limited to *Acanthoscelides* spp. (weevils), *Acanthoscelides obtectus* (common bean weevil), *Agrilus planipennis* (emerald ash borer), *Agriotes* spp. (wireworms), *Anoplophora glabripennis* (Asian longhorned beetle), *Anthonomus* spp. (weevils), *Anthonomus grandis* (boll weevil), *Aphidius* spp., *Apion* spp. (weevils), *Apogonia* spp. (grubs), *Ataenius spretulus* (Black Turgrass *Ataenius*), *Atomaria linearis* (pygmy mangold beetle), *Aulacophore* spp., *Bothynoderes punctiventris* (beet root weevil), *Bruchus* spp. (weevils), *Bruchus pisorum* (pea weevil), *Cacoesia* spp., *Callosobruchus maculatus* (southern cow pea weevil), *Carpophilus hemipteras* (dried fruit beetle), *Cassida vittata*, *Cerosterna* spp, *Cerotoma* spp. (chrysomeids), *Cerotoma trifurcata* (bean leaf beetle), *Ceutorhynchus* spp. (weevils), *Ceutorhynchus assimilis* (cabbage seedpod weevil), *Ceutorhynchus napi* (cabbage curculio), *Chaetocnema* spp. (chrysomelids), *Colaspis* spp. (soil beetles), *Conoderus scalaris*, *Conoderus stigmosus*, *Conotrachelus nenuphar* (plum curculio), *Cotinus nitidis* (Green June beetle), *Criocetis asparagi* (asparagus beetle), *Cryptolestes ferrugineus* (rusty grain beetle), *Cryptolestes pusillus* (flat grain beetle), *Cryptolestes turcicus* (Turkish grain beetle), *Ctenicera* spp. (wireworms), *Curculio* spp. (weevils), *Cyclocephala* spp. (grubs), *Cylindrocpturus adspersus* (sunflower stem weevil), *Deporaus marginatus* (mango leaf-cutting weevil), *Dermestes lardarius* (larder beetle), *Dermestes maculates* (hide beetle), *Diabrotica* spp. (chrysolemids), *Epilachna varivestis* (Mexican bean beetle), *Faustinus cubae*, *Hylobius pales* (pales weevil), *Hypera* spp. (weevils), *Hypera postica* (alfalfa weevil), *Hyperdoes* spp. (Hyperodes weevil), *Hypothenemus hampei* (coffee berry beetle), *Ips* spp. (engravers), *Lasioderma serricorne* (cigarette beetle), *Leptinotarsa decemlineata* (Colorado potato beetle), *Liogenys futscus*, *Liogenys suturalis*, *Lissorhoptrus oryzophilus* (rice water weevil), *Lyctus* spp. (wood beetles/powder post beetles), *Maecolaspis joliveti*, *Megascelis* spp., *Melanotus communis*, *Meligethes* spp., *Meligethes aeneus* (blossom beetle), *Melolontha melolontha* (common European cockchafer), *Oberea brevis*, *Oberea linearis*, *Oryctes* rhinoceros (date palm beetle), *Oryzaephilus mercator* (merchant grain beetle), *Oryzaephilus surinamensis* (sawtoothed grain beetle), *Otiorhynchus* spp. (weevils), *Oulema melanopus* (cereal leaf beetle), *Oulema oryzae, Pantomorus* spp. (weevils), *Phyllophaga* spp. (May/June beetle), *Phyllophaga cuyabana, Phyllotreta* spp. (chrysomelids), *Phynchites* spp., *Popillia japonica* (Japanese beetle), *Prostephanus truncates* (larger grain borer), *Rhizopertha dominica* (lesser grain borer), *Rhizotrogus* spp. (Eurpoean chafer), *Rhynchophorus* spp. (weevils), *Scolytus* spp. (wood beetles), *Shenophorus* spp. (Billbug), *Sitona lineatus* (pea leaf weevil), *Sitophilus* spp. (grain weevils), *Sitophilus* granaries (granary weevil), *Sitophilus oryzae* (rice weevil), *Stegobium paniceum* (drugstore beetle), *Tribolium* spp. (flour beetles), *Tribolium castaneum* (red flour beetle), *Tribolium confusum* (confused flour beetle), *Trogoderma variabile* (warehouse beetle) and *Zabrus tenebioides*.

In an embodiment, the insect pests are of the order Hemiptera, such as *Acrosternum hilare* (green stink bug), *Blissus leucopterus* (chinch bug), *Calocoris norvegicus* (potato mind), *Cimex hemipterus* (tropical bed bug), *Cimex lectularius* (bed bug), *Dagbertus fasciatus, Dichelops furcatus, Dysdercus suturellus* (cotton stainer), *Edessa meditabunda, Eurygaster maura* (cereal bug), *Euschistus heros, Euschistus servus* (brown stink bug), *Helopeltis antonii, Helopeltis theivora* (tea blight plantbug), *Lagynotomus* spp. (stink bugs), *Leptocorisa oratorius, Leptocorisa varicornis, Lygus* spp. (plant bugs), *Lygus hesperus* (western tarnished plant bug), *Maconellicoccus hirsutus, Neurocolpus longirostris, Nezara viridula* (southern green stink bug), *Paratrioza cockerelli, Phytocoris* spp. (plant bugs), *Phytocoris californicus, Phytocoris relativus, Piezodorus guildingi, Poecilocapsus lineatus* (fourlined plant bug), *Psallus vaccinicola, Pseudacysta perseae, Scaptocoris castanea* and *Triatoma* spp. (bloodsucking conenose bugs/kissing bugs).

In an embodiment, the insect pests are of the order Homoptera, such as *Acrythosiphon pisum* (pea aphid), *Adelges* spp. (adelgids), *Aleurodella proletella* (cabbage whitefly), *Aleurodicus disperses, Aleurothrixus floccosus* (woolly whitefly), *Aluacaspis* spp., *Amrasca bigutella bigutella, Aphrophora* spp. (leafhoppers), *Aonidiella aurantii*(California red scale), *Aphis* spp. (aphids), *Aphis gossypii* (cotton aphid), *Aphis pomi* (apple aphid), *Aulacorthum solani* (foxglove aphid), *Bemisia* spp. (whiteflies), *Bemisia argentifolii, Bemisia tabaci* (sweet potato whitefly), *Brachycolus noxius* (Russian aphid), *Brachycorynella asparagi* (asparagus aphid), *Brevennia rehi, Brevicoryne brassicae* (cabbage aphid), *Ceroplastes* spp. (scales), *Ceroplastes rubens* (red bawax scale), *Chionaspis* spp. (scales), *Chrysomphalus* spp. (scales), *Coccus* spp. (scales), *Dysaphis plantaginea* (rosy apple aphid), *Empoasca* spp. (leafhoppers), *Eriosoma lanigerum* (woolly apple aphid), *Icerya purchasi* (cottony cushion scale), *Idioscopus nitidulus* (mango leafhopper), *Laodelphax striatellus* (smaller brown planthopper), *Lepidosaphes* spp., *Macrosiphum* spp., *Macrosiphum euphorbiae* (potato aphid), *Macrosiphum granarium* (English grain aphid), *Macrosiphum rosae* (rose aphid), *Macrosteles quadrilineatus* (aster leafhopper), *Mahanarva frimbiolata, Metopolophium dirhodum* (rose grain aphid), *Mictis longicornis, Myzus persicae* (green peach aphid), *Nephotettix* spp. (leafhoppers), *Nephotettix cinctipes* (green leafhopper), *Nilaparvata lugens* (brown planthopper), *Parlatoria pergandii* (chaff scale), *Parlatoria ziziphi* (ebony scale), *Peregrinus maidis* (corn delphacid), *Philaenus* spp. (spittlebugs), *Phylloxera vitifoliae* (grape phylloxera), *Physokermes piceae* (spruce bud scale), *Planococcus* spp. (mealybugs), *Pseudococcus* spp. (mealybugs), *Pseudococcus brevipes* (pine apple mealybug), *Quadraspidiotus perniciosus* (San Jose scale), *Rhapalosiphum* spp. (aphids), *Rhapalosiphum maida* (corn leaf aphid), *Rhapalosiphum padi* (oat bird-cherry aphid), *Saissetia* spp. (scales), *Saissetia oleae* (black scale), *Schizaphis graminum* (greenbug), *Sitobion avenae* (English grain aphid), *Sogatella furcifera* (white-backed planthopper), *Therioaphis* spp. (aphids), *Toumeyella* spp. (scales), *Toxoptera* spp. (aphids), *Trialeurodes* spp. (whiteflies), *Trialeurodes vaporariorum* (greenhouse whitefly), *Trialeurodes abutiloneus* (bandedwing whitefly), *Unaspis* spp. (scales), *Unaspis yanonensis* (arrowhead scale) and *Zulia entreriana*.

EXAMPLES

Example 1: Preparation of Acetamiprid 500 g/L Suspension Concentrate (SC)

| # | Ingredients | Quantity in % (w/w) |
|---|---|---|
| 1 | Acetamiprid | 42 |
| 2 | EO-PO block copolymer | 1.5 |
| 3 | Sodium lignosulphonate | 0.5 |
| 4 | Precipitate silica | 0.1 |
| 5 | Hydrotreated light paraffinic distillate | 3 |
| 6 | Propylene glycol | 5.2 |
| 7 | Xanthan gum | 0.05 |
| 8 | 1,2-Benzisothiazolin-3-one | 0.10 |
| 9 | Nonionic aqueous emulsion of polydimethylsiloxane | 0.1 |
| 10 | Water | QS |

42 g Acetamiprid, crystal growth inhibiting system comprising 1.5 g EO-PO block copolymer, 0.5 g sodium lignosulphonate, 3 g Hydrotreated light paraffinic distillate, 0.1 g precipitated silica, water, 5.2 g propylene glycol, 0.05 g xanthan gum, 0.1 g 1,2-Benzisothiazolin-3-one and 0.1 g, nonionic aqueous emulsion of polydimethylsiloxane were charged in required quantities in homogenizer. Homogenization was carried out for 20 Minutes to obtain homogenized mixture. The homogenized mixture of step 1 then is fed to the wet grinding mill for particle size reduction. The uniform mixture thus obtained in milling was then transferred to gellification vessel containing pre-formulated 2% gel obtained by mixing 0.2 g xanthan gum in 10 ml water to obtain suspension concentrate. The suspension concentrate was allowed to stand for 4 hours before use.

Example 2: Preparation of Acetamiprid 50 g/L Suspension Concentrate (SC)

| # | Ingredients | Quantity in % (w/w) |
|---|---|---|
| 1 | Acetamiprid | 46 |
| 2 | EO-PO block copolymer | 4.5 |
| 3 | Sodium lignosulphonate | 3 |
| 4 | Precipitate silica | 2 |
| 5 | Hydrotreated light paraffinic distillate | 8 |
| 6 | Propylene glycol | 12.8 |
| 7 | Xanthan gum | 0.15 |
| 8 | 1,2-Benzisothiazolin-3-one | 0.15 |
| 9 | Nonionic aqueous emulsion of polydimethylsiloxane | 0.6 |
| 10 | Water | QS |

Acetamiprid, EO-PO block copolymer, sodium lignosulphonate, hydrotreated light paraffinic distillate, precipitated silica, propylene glycol, xanthan gum, 1,2-Benzisothiazolin-3-one and nonionic aqueous emulsion of polydimethylsiloxane were mixed in water in a given ratio shown above and suspension concentrate was prepared as per the process of Example 1.

Example 3: Preparation of Flonicamid 500 g/L Suspension Concentrate (SC)

| Sl. No | Ingredients | Quantity in % (w/w) |
| --- | --- | --- |
| 1 | Flonicamid | 42.5 |
| 2 | EO-PO block copolymer | 1.5 |
| 3 | Sodium lignosulphonate | 2.5 |
| 4 | Precipitate silica | 1.0 |
| 5 | Hydrotreated light paraffinic distillate | 5 |
| 6 | Propylene glycol | 8.5 |
| 7 | Xanthan gum | 0.05 |
| 8 | 1,2-Benzisothiazolin-3-one | 0.10 |
| 9 | Acetic acid | 0.08 |
| 10 | Nonionic aqueous emulsion of polydimethylsiloxane | 0.2 |
| 11 | Water | QS |

Flonicamid, EO-PO block copolymer, sodium lignosulphonate, precipitated silica, hydrotreated light paraffinic distillate, propylene glycol, xanthan gum, 1,2-Benzisothiazolin-3-one, acetic acid and nonionic aqueous emulsion of polydimethylsiloxane were mixed in water in a given ratio shown above and suspension concentrate was prepared as per the process of Example 1.

Example 4: Preparation of Flonicamid 500 g/L Flowable Concentrate for Seed Treatment (FS)

| # | Ingredients | Quantity (% w/w) |
| --- | --- | --- |
| 1 | Flonicamid Technical | 42.5 |
| 2 | EO-PO block copolymer | 1.5 |
| 3 | Sodium lignosulphonate | 2.5 |
| 4 | Precipitate silica | 1.0 |
| 5 | Hydrotreated light paraffinic distillate | 5 |
| 6 | Propylene glycol | 8.5 |
| 7 | Organic Azo Pigment | 1.0 |
| 8 | Xanthan gum | 0.05 |
| 9 | 1,2-Benzisothiazolin-3-one | 0.10 |
| 10 | Acetic acid | 0.08 |
| 11 | Nonionic aqueous emulsion of polydimethylsiloxane | 0.2 |
| 12 | Water | QS |
| | | 100.00 |

Flonicamid, EO-PO block copolymer, sodium lignosulphonate, precipitated silica, hydrotreated light paraffinic distillate, propylene glycol, organic azo pigment, xanthan gum, 1,2-Benzisothiazolin-3-one, acetic acid and nonionic aqueous emulsion of polydimethylsiloxane were mixed in water in a given ratio shown above and suspension concentrate was prepared as per the process of Example 1.

Stability Study

Stability features associated with the composition developed according to the present invention were studied. The compositions described in Example-1 and Example 3 were taken further to evaluate physicochemical parameters. It was found that the compositions of Example-1 and Example-3 remained stable when tested at ambient conditions i.e. room temperature and pressure. The compositions also passed 14 days Accelerated Heat Stability (AHS) test and remained flowable suspension in off-white appearance. Amount of active content also been evaluated at ambient and AHS stages. It was found that active content remained almost constant without any significant deterioration or loss. The compositions also passed wet sieve testing as no crystals were observed to be retained on wet sieve. Particle size of composition was analysed and found to be nearly constant suggesting little/negligible particle size growth or crystal formation. Results of Example-1 is tabulated in Table 1 and the results of Example-3 is tabulated in Table 2)

TABLE 1

| Sr. No. | Parameter | AMB | AHS 14 days |
| --- | --- | --- | --- |
| 1 | Acetamiprid Assay (% w/w) | 43.3 | 43.3 |
| 2 | Density at 25° C. (g/ml) | 1.160 | 1.160 |
| 3 | Viscosity #63, 60 rpm (cps) | 380 | 372 |
| 4 | Particle Size D (50) | 2.41 | 4.40 |
| 5 | pH | 5.4 | 5.5 |
| 6 | Wet Screen Test (retention on 200 mesh) | Nil | Nil |

TABLE 2

| Sr. No. | Parameter | AMB | AHS 14 days |
| --- | --- | --- | --- |
| 1 | Flonicamid Assay (% w/w) | 42.5 | 42.5 |
| 2 | Density at 25° C. (g/ml) | 1.210 | 1.210 |
| 3 | Viscosity #63, 60 rpm (cps) | 316 | 320 |
| 4 | Particle Size D (50) | 2.35 | 2.40 |
| 5 | pH | 6.4 | 5.9 |
| 6 | Wet Screen Test (retention on 200 mesh) | Nil | Nil |

Example-5: Preparation of Imidacloprid 500 g/L Suspension Concentrate (SC)

| # | Ingredients | Quantity (% w/w) |
| --- | --- | --- |
| 1 | Imidacloprid Technical (98%) | 42.30 |
| 2 | EO-PO block copolymer | 2.50 |
| 3 | Glycerin | 10.0 |
| 4 | Sodium lignosulphonate | 2.50 |
| 5 | Precipitate silica | 0.30 |
| 6 | White mineral oil | 6.00 |
| 7 | Propylene glycol | 0.40 |
| 8 | Xanthan gum | 0.15 |
| 9 | 1,2-Benzisothiazolin-3-one | 0.15 |
| 10 | Antifoam | 0.20 |
| 11 | Water | 35.50 |
| | Total | 100.00 |

Imidacloprid, EO-PO block copolymer, glycerine, sodium lignosulphonate, precipitated silica, white mineral oil, propylene glycol, xanthan gum, 1,2-Benzisothiazolin-3-one and antifoam were mixed in water in a given ratio shown above and suspension concentrate was prepared as per the process of Example 1.

Example-6: Preparation of Clothianidin 500 g/L Suspension Concentrate (SC)

| # | Ingredients | (Quantity % w/w) |
| --- | --- | --- |
| 1 | Clothianidin Technical (98%) | 42.60 |
| 2 | EO-PO block copolymer | 3.00 |
| 3 | Glycerin | 10.0 |
| 4 | Sodium lignosulphonate | 2.00 |

-continued

| # | Ingredients | (Quantity % w/w) |
|---|---|---|
| 5 | Precipitate silica | 0.30 |
| 6 | White mineral oil | 6.00 |
| 7 | Propylene glycol | 0.40 |
| 8 | Xanthan gum | 0.12 |
| 9 | 1,2-Benzisothiazolin-3-one | 0.15 |
| 10 | Antifoam | 0.20 |
| 11 | Water | 35.23 |
| | Total | 100.00 |

Clothianidin, EO-PO block copolymer, glycerine, sodium lignosulphonate, precipitated silica, white mineral oil, propylene glycol, xanthan gum, 1,2-Benzisothiazolin-3-one and antifoam were mixed in water in a given ratio shown above and suspension concentrate was prepared as per the process of Example 1.

Example-7: Preparation of Thiamethoxam 500 g/L Suspension Concentrate (SC)

| # | Ingredients | Quantity (% w/w) |
|---|---|---|
| 1 | Thiamethoxam Technical (97%) | 42.80 |
| 2 | EO-PO block copolymer | 2.00 |
| 3 | Glycerin | 10.0 |
| 4 | Sodium lignosulphonate | 2.50 |
| 5 | Precipitate silica | 0.30 |
| 6 | White mineral oil | 6.00 |
| 7 | Propylene glycol | 0.40 |
| 8 | Xanthan gum | 0.15 |
| 9 | 1,2-Benzisothiazolin-3-one | 0.15 |
| 10 | Antifoam | 0.20 |
| 11 | Water | 35.50 |
| | Total | 100.00 |

Thiamethoxam, EO-PO block copolymer, glycerin, sodium lignosulphonate, precipitated silica, white mineral oil, propylene glycol, xanthan gum, 1,2-Benzisothiazolin-3-one and antifoam were mixed in water in a given ratio shown above and suspension concentrate was prepared as per the process of Example 1.

Comparative Examples

A comparative study was performed to understand the effect of crystal growth inhibiting system comprising mineral oil, non-ionic surfactant and anionic surfactant in the agrochemical composition. Composition prepared in Example-8 where EO/PO block copolymer was not added. Composition prepared in Example-9 where anionic surfactant (lignosulfonate) was not added. Composition prepared in Example-10 where mineral oil was not added. All the compositions were evaluated in ambient as well as in Accelerated Heat Stability (AHS) conditions. Results of the study are presented in Table 3. It was observed that compositions of Example 8, Example 9 and Example 10 were found to be stable in ambient conditions. These compositions remained as an off-white colored suspension concentrate free from extraneous matter. However, Example 8, Example 9 and Example 10 failed in AHS conducted for 14 days at 54° C. Curding of dispersed phase was observed and became solidified thus failed to comply the standard specifications when tested in AHS. It was concluded that crystal growth inhibiting system comprising mineral oil, non-ionic surfactant and anionic surfactant impart stability to the agrochemical compositions prepared according to the present invention. The compositions of Example 8 and Example 9 prepared were also investigated for wet sieve analysis. Both the compositions were found to have passed wet sieve test as 100% of the sample passed through 75 μm mesh. However, some retention was found in composition of Example 10. (Table 3)

TABLE 3

| # | Ingredients | Example 8 | Example 9 | Example 10 |
|---|---|---|---|---|
| | | Quantity in % (w/w) | | |
| 1 | Acetamiprid | 46 | 46 | 46 |
| 2 | EO-PO block copolymer | 0 | 4.5 | 4.5 |
| 3 | Sodium ligno sulphonate | 3 | 0 | 3 |
| 4 | Precipitate silica | 2 | 2 | 2 |
| 5 | Hydrotreated light paraffinic distillate | 8 | 5 | 0 |
| 6 | Propylene glycol | 12.8 | 12.8 | 12.8 |
| 7 | Xanthan gum | 0.15 | 0.15 | 0.15 |
| 8 | 1,2-Benzisothiazolin-3-one | 0.15 | 0.15 | 0.15 |
| 9 | Antifoam | 0.6 | 0.6 | 0.6 |
| 10 | Water | QS | QS | QS |
| | | Ambient | 14 AHS | Ambient | 14 AHS | Ambient | 14 AHS |
| | Density at 25° C. (g/ml) | 1.155 | NA | 1.163 | NA | 1.164 | NA |
| | Viscosity #63, 60 rpm (ops) | 372 | Thickened | 352 | Thickened | 361 | 402 |
| | Particle Size D (50) | 1.63 | NA | 1.78 | NA | 2.12 | 5.56 |
| | D | ` | | | NA | 5.78 | 18.4 |
| | pH | 7.3 | NA | 6.6 | NA | 8.0 | 8.2 |
| | Wet Screen Test (retention on 200 mesh) | Nil | NA | Nil | NA | Nil | 0.22% (fine crystals) |
| | Observation | Formulation Failed in 14 days aging AHS. | | Formulation Failed in 14 days aging AHS. | | Formulation Failed in 14 days aging AHS. | |

The crystal growth inhibiting system of the present invention were used successfully to impart stability to the agrochemical compositions, with stability monitored over 14 days. The crystal growth inhibiting system provided good rheology performance over time, low or no sedimentation, and little particle size degradation. The Suspension Concentrate composition prepared according to the present invention also passed suspensibility testing indicating that the crystal growth inhibiting system do not cause negative effects upon use and storage. It is to be understood that the invention is not to be limited to the details of the above embodiments, which are described by way of example only. Many variations are possible.

The invention claimed is:

1. An agrochemical composition consisting of:
   a) acetamiprid;
   b) a crystal growth inhibiting system consisting of a mineral oil and a surfactant mixture of an anionic and non-ionic surfactant;
   c) a thickening agent;
   d) one or more formulation aids selected from the group consisting of antifreeze agents, wetting agents, fillers, anticaking agents, pH-regulating agents, preservatives, antifoaming agents, and colorants; and
   e) water,
   wherein the mineral oil is selected from the group consisting of hydrotreated light paraffinic distillate, petroleum, spindle oil, and mixtures thereof,
   wherein the acetamiprid is from about 0.1% to about 70% w/w,
   the mineral oil is from about 0.1% to about 40% w/w,
   the non-ionic surfactant is from about 0.1% to about 40% w/w,
   the anionic surfactant is from about 0.1% to about 40% w/w,
   all based on the total weight of the agrochemical composition, and
   wherein said agrochemical composition is in the form of suspension concentrate (SC) or a flowable concentrate for seed treatment (FS).

2. The agrochemical composition as claimed in claim 1, wherein the mineral oil is hydrotreated light paraffinic distillate.

3. The agrochemical composition as claimed in claim 1, wherein the anionic surfactant is selected from the group consisting of alkyl sulfates, aryl sulfates, alkyl sulfonates, aryl sulfonates, lignins, sodium alkane sulfonates, polyoxyalkyene alkylether sulfate, polyoxy-alkylene styrylphenyl ether sulfate, alkylnaphthalene sulfonate formaldehyde condensate, sulfosuccinates, and mixtures thereof.

4. The agrochemical composition as claimed in claim 1, wherein the nonionic surfactant is selected from the group consisting of block copolymeric surfactants derived from alkylene oxides, aliphatic amines or fatty acids with ethylene oxides and/or propylene oxides, mixtures, reaction products, and/or copolymers thereof.

5. A process for preparing the agrochemical composition of claim 1 in the form of a suspension concentrate (SC), consisting of:
   (a) admixing the acetamiprid and an aqueous solution consisting of the crystal growth inhibiting system, the thickener, the one or more formulation aids, and water to obtain a mixture;
   (b) milling the mixture to obtain a uniform dispersion;
   (c) admixing the uniform dispersion with the thickening agent; and
   (d) jellifying the uniform dispersion of step (c) to obtain a suspension concentrate (SC).

6. A method of controlling undesired insects, said method comprising applying to the undesired insects or to their locus an insecticidally effective amount of the agrochemical composition of claim 1.

* * * * *